(12) United States Patent
Richardson et al.

(10) Patent No.: US 12,270,651 B2
(45) Date of Patent: Apr. 8, 2025

(54) METHODS AND SYSTEM FOR SELF-CHECKING SENSOR NETWORK

(71) Applicant: VOCIS LIMITED, Lindley (GB)

(72) Inventors: James M. Richardson, Hinckley (GB); Richard Barnbrook, Cubbington (GB)

(73) Assignee: VOCIS LIMITED, Lindley (GB)

( * ) Notice: Subject to any disclaimer, the term of this patent is extended or adjusted under 35 U.S.C. 154(b) by 0 days.

(21) Appl. No.: 18/468,359

(22) Filed: Sep. 15, 2023

(65) Prior Publication Data

US 2024/0003683 A1 Jan. 4, 2024

Related U.S. Application Data

(62) Division of application No. 16/999,984, filed on Aug. 21, 2020, now Pat. No. 11,852,480.

(51) Int. Cl.
| | |
|---|---|
| *G01C 19/00* | (2013.01) |
| *E02F 9/26* | (2006.01) |
| *G01F 15/18* | (2006.01) |

(52) U.S. Cl.
CPC ............. *G01C 19/00* (2013.01); *E02F 9/26* (2013.01); *E02F 9/267* (2013.01); *G01F 15/18* (2013.01)

(58) Field of Classification Search
CPC .. G01C 19/00; E02F 9/26; E02F 9/267; G01P 15/18
See application file for complete search history.

(56) References Cited

U.S. PATENT DOCUMENTS

| | | |
|---|---|---|
| 6,853,920 B2 | 2/2005 | Hsiung et al. |
| 6,985,779 B2 | 1/2006 | Hsiung et al. |
| 2012/0125790 A1 | 5/2012 | Wohlrab et al. |
| 2015/0266490 A1 | 9/2015 | Coelingh et al. |
| 2016/0252366 A1* | 9/2016 | Park .................. G01C 25/005 73/1.37 |
| 2019/0129404 A1 | 5/2019 | Cella et al. |

\* cited by examiner

*Primary Examiner* — Yufeng Zhang
(74) *Attorney, Agent, or Firm* — McCoy Russell LLP

(57) ABSTRACT

Methods and systems for operating a system that includes an array of sensors are described. In one example, output of sensors included in the array is characterized as being in one of a plurality of states. Diagnostics may be performed on sensors in the array of sensors based on sensors being in one of the plurality of states.

7 Claims, 15 Drawing Sheets

FIG. 1B
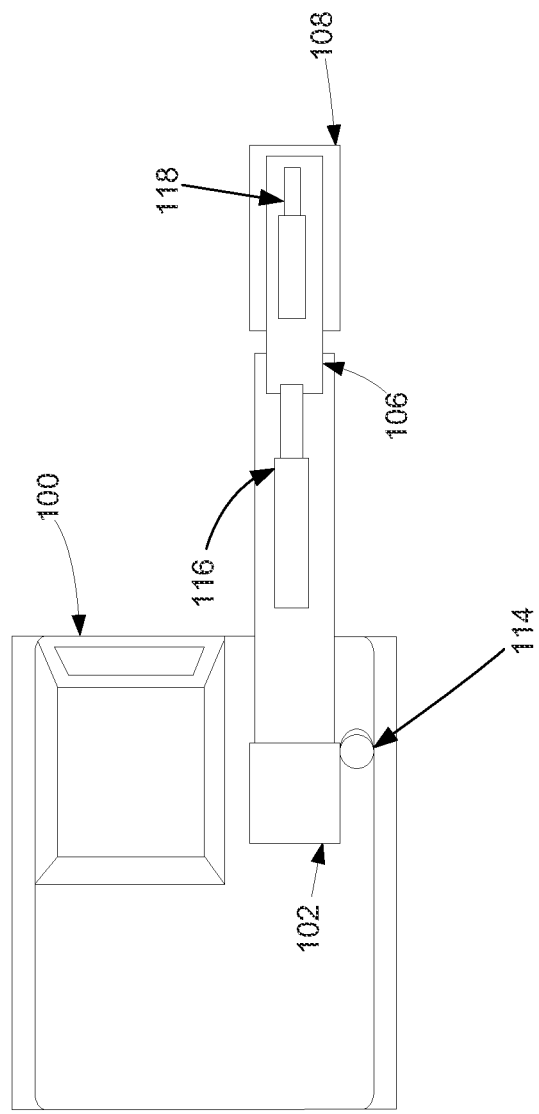
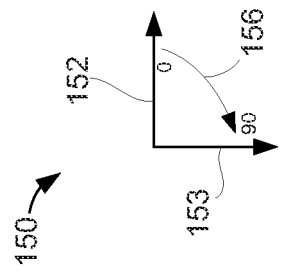

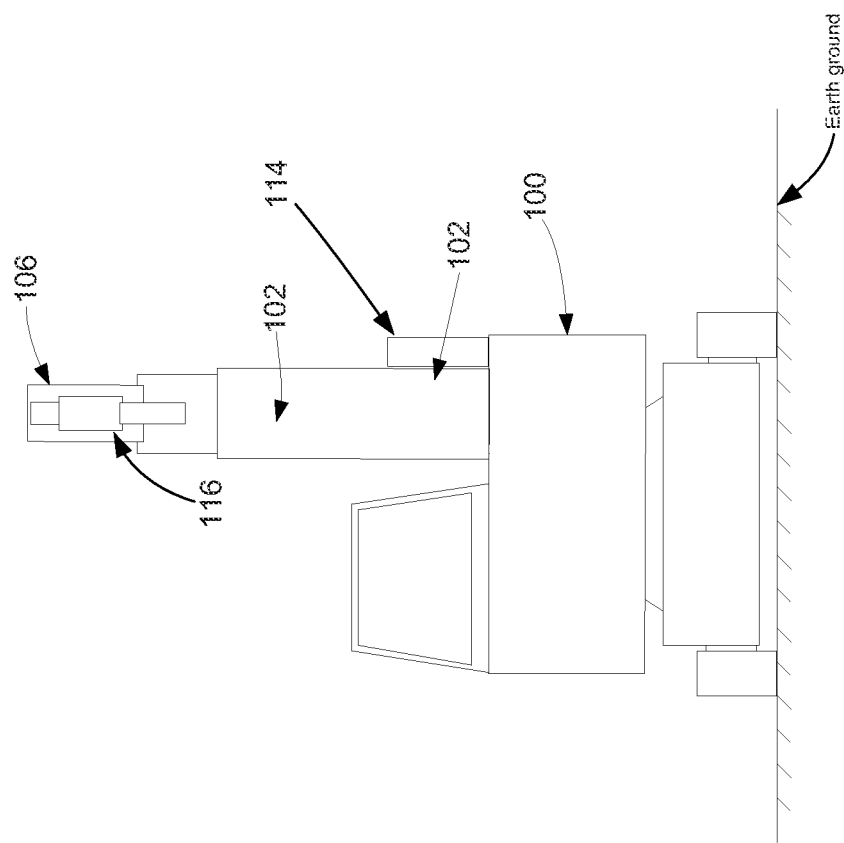
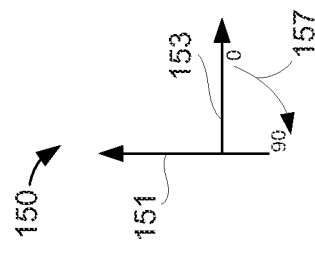
FIG. 1C

METHODS AND SYSTEM FOR SELF-CHECKING SENSOR NETWORK

CROSS REFERENCE TO RELATED APPLICATION

The present application is a divisional of U.S. Non-Provisional patent application Ser. No. 16/999,984, entitled "METHODS AND SYSTEM FOR SELF-CHECKING SENSOR NETWORK", and filed on Aug. 21, 2020. The entire contents of the above-listed application are hereby incorporated by reference for all purposes.

TECHNICAL FIELD

The present description relates generally to methods and a system for operating and diagnosing a system that includes a network of sensors. The methods and systems may be applied to verify operation of sensors without having to apply redundant sensors.

BACKGROUND AND SUMMARY

A system, such as a vehicle or machine, may include a plurality of sensors to report operating conditions of the system. Individual sensors may provide data regarding states of particular components or operating conditions. For example, a sensor, such as an accelerometer, may output lateral (e.g. Y-axis) acceleration, longitudinal (e.g., X-axis) acceleration, and vertical (e.g., Z-axis) acceleration data for a boom of an excavator or digger. The sensor data may be applied to control and limit motion of the vehicle. However, if output of the sensor degrades (e.g., sensor output deviates from actual conditions being monitored by the sensor by more than a desired amount), it may be difficult to control the vehicle as precisely as may be desired. Furthermore, the sensor may occasionally perform a self-reset to compensate for sensor drift. However, if the reset is performed when the actual sensor drift is small, error in the sensor output may increase. For at least these reasons, it may be desirable to verify sensor output. One way to verify output of a sensor is to compare the output of the sensor with output of a similarly situated redundant sensor. However, a redundant sensor increases system cost and complexity. Therefore, it may be desirable to provide a way of verifying sensor output without adding redundant sensors to the system.

The inventor herein has recognized the above-mentioned issues and has developed a method for operating a system that includes an array of sensors, comprising: characterizing operation of a first sensor as being in one of a plurality of sensor states via a controller; characterizing operation of each of a plurality of sensors as being in one of the plurality of sensor states via the controller; and indicating the first sensor is degraded via the controller in response to the first sensor being in one of the plurality of sensor states and at least one of the plurality of sensors being in a different state than the one of the plurality of sensor states.

By characterizing sensor operation in one of a plurality of states, it may be possible to assess operation of a particular sensor in an array of sensors without having to add redundant sensors to the system. In one example, operation of a selected sensor may be characterized as being "stationary," "holding," or "active." Similarly, operation of two other sensors in the system is characterized in the same way. Degradation of the selected sensor may be evaluated based on the state of the selected sensor versus the states of the two other sensors. The two other sensors are positioned at different locations of the system and the two sensors provide output data that is based on their particular physical location in the system. In this way, operation of one sensor may be based on operation of two other sensors in the system. This allows sensors that provide data for locations in the system that are different than the location of the selected sensor to be the basis for evaluating the selected sensor.

The present description may provide several advantages. In particular, the approach may reduce system complexity and cost. Further, the approach may reduce the possibility of false sensor degradation assessments. In addition, the approach may provide for improved operation of a machine by limiting machine operation if sensor degradation is perceived.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 1A-1C show several views of an example vehicle that includes an array of sensors;

DETAILED DESCRIPTION

The following description relates to systems and methods for operating a system that includes an array of sensors. The sensor array may comprise accelerometers, gyros, pressure sensors, temperature sensors, position sensors, audio sensors, range detecting sensors, light sensors, and other types of known sensors. Output of one sensor included in the array of sensors, may be estimated via output of other sensors that are not immediately proximate to the one sensor. In one example, output of a sensor being evaluated (e.g., the selected sensor) is converted to an angular rate (e.g., a sensed angular rate) and the angular rate that is determined from the one sensor is compared to an angular rate (e.g., a reference angular rate) that is determined from output of two different sensors that are not immediately proximate to the one sensor. If the reference angular rate deviates from the sensed angular rate by more than a threshold amount, a controller may take mitigating actions.

Figure 1A:
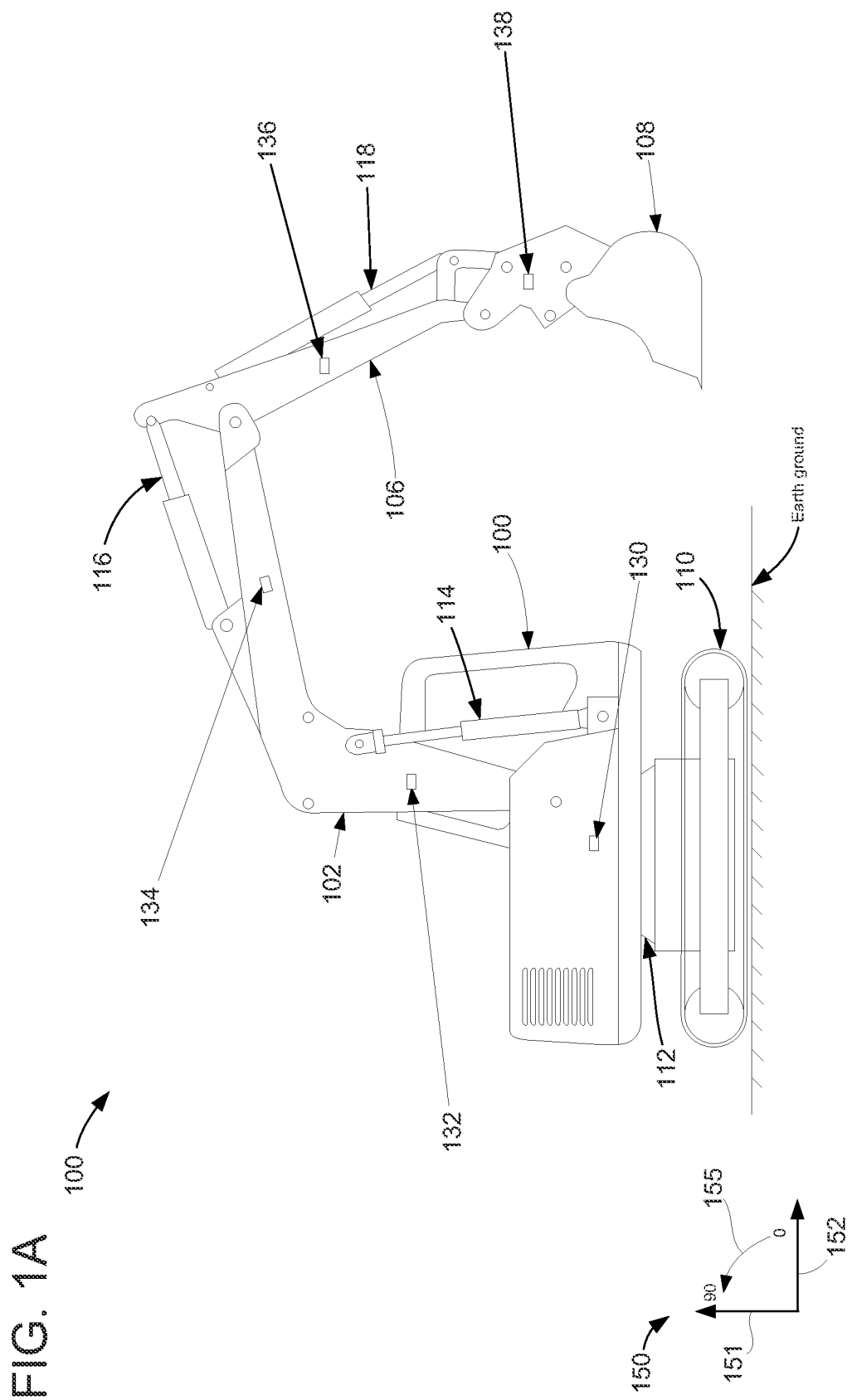
Figure 2:
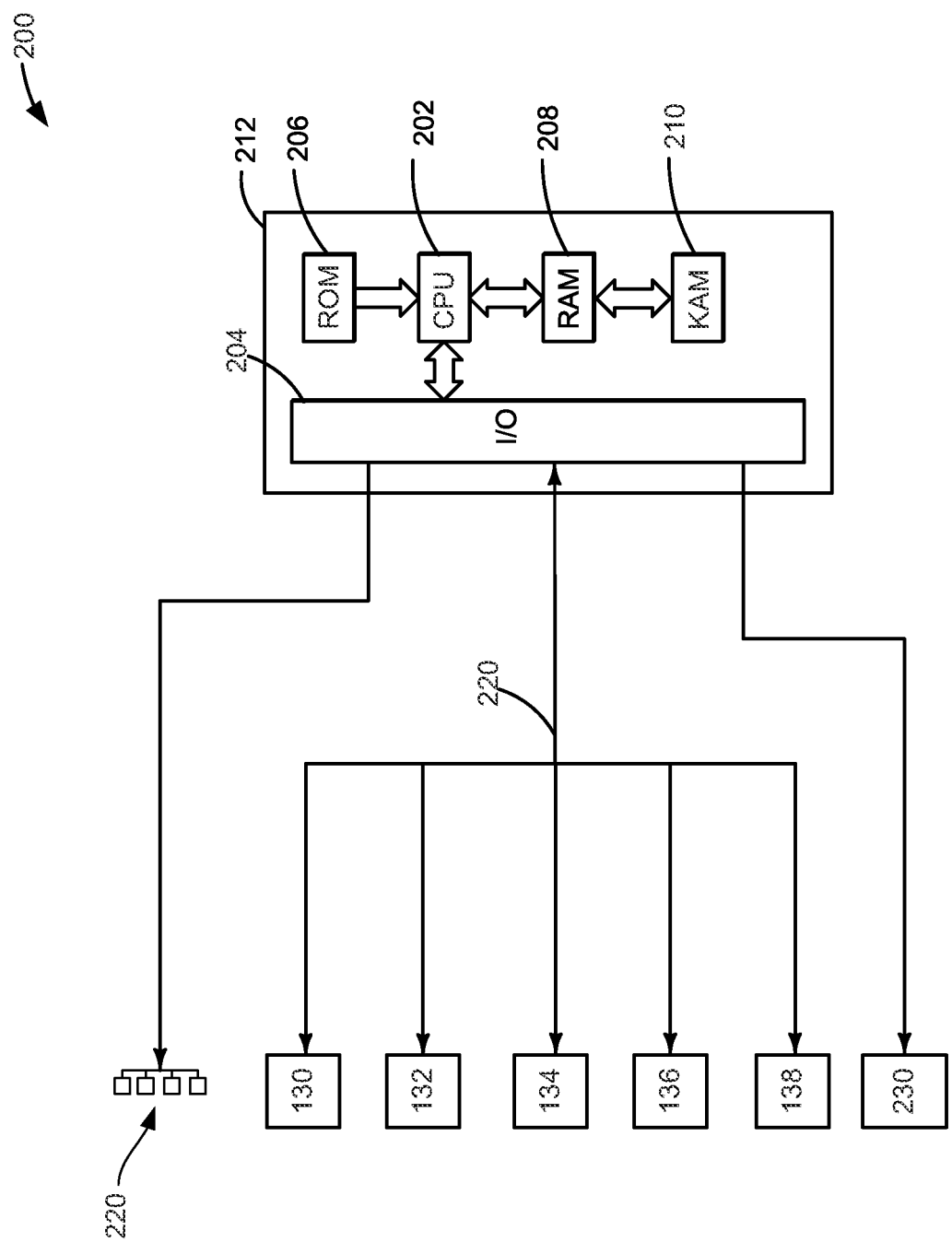
FIG. 2 is a schematic diagram of a control system for the example vehicle.
Figure 3:
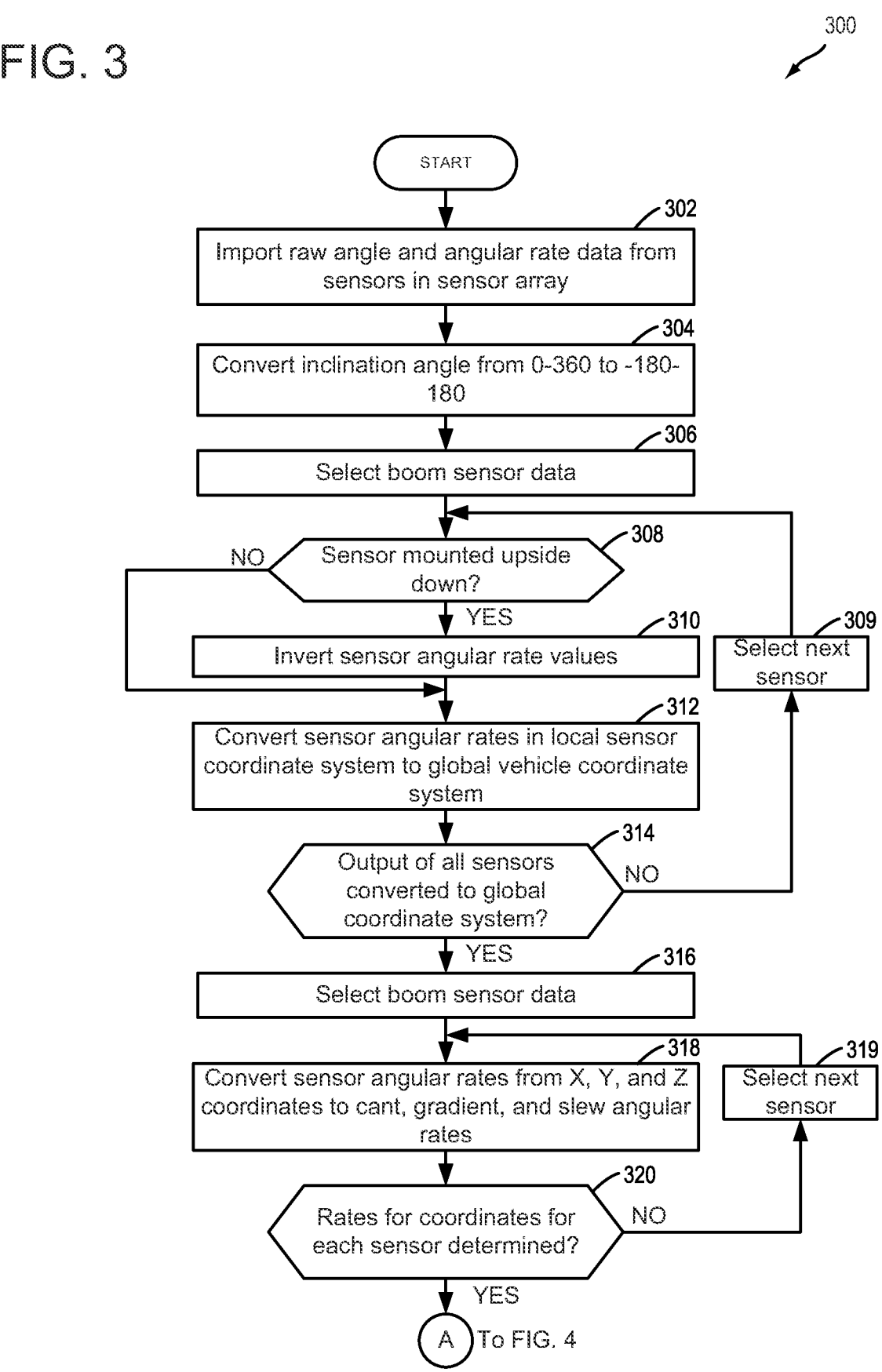
FIGS. 3-7 show a flowchart of a method for operating a system that includes an array of sensors.

FIGS. 1A-1C shows several views of an example machine for which angular rate output data of one sensor is compared to angular rate output as determined from two "buddy" sensors (e.g., sensors associated with verifying operation of a selected sensor). However, it should be appreciated that the system and methods described herein are not limited to the type of machine shown in FIGS. 1A-1C. Rather, the system and method described herein may be applied to other machines or mechanisms such as but not limited to cranes, backhoes, motor graders, crawlers, scrapers, etc. Further, the method and system described herein may be applied to sensors other than accelerometers (e.g., pressure sensors, temperature sensors, position sensors, etc.). FIG. 2 shows an example controller for a self-checking sensor array network. The controller is electrically coupled to sensors and actuators. FIGS. 3-7 show a flowchart of an example method for operating a system that includes a sensor array network. FIGS. 8-13 show example sequences for operating the sensor array network and an associated system.

FIG. 1A illustrates an example machine 100 (e.g., a vehicle) that includes a plurality of sensors that may be used to determine its motion. In this example, machine 100 includes a cab 100 that is coupled to a propulsion device 110 (e.g., a drive track). Cab 100 may rotate about the drive track 110 via swing gear 112. Boom 132 is coupled to cab 100 and it may move relative to cab 100 via hydraulic cylinder 114. An arm 106 is coupled to the boom 104 such that the arm 106 may pivot about the boom 104. Hydraulic cylinder 116 may extend or retract to cause arm 106 to pivot about boom 104. A tool 108 (e.g., a bucket) is coupled to arm 106 and the tool 108 may pivot about the arm 106. Hydraulic cylinder 118 may be extended and retracted to cause tool 108 to pivot about arm 106. The direction of power delivery is from the cab 100 to the tool 108 via the various coupled components (e.g., boom, artic, arm, and tool). Thus, cab 100 is upstream of tool 108 according to the direction of power delivery of the system.

Machine 100 also includes an array of 6-axis accelerometers to determine motion of its various components. Specifically, the array includes a cab pitch and roll sensor 130, a boom sensor 132, an artic sensor 134, an arm sensor 136, and a tool sensor 138. Each of the sensors may determine angular motion of the machine component that it is mounted to and output the data via a rotation matrix, quaternion, or Euler angular format. The sensors may determine angular motion and acceleration via X, Y, and Z axis accelerometers and gyroscopes that detect angular motion about the X, Y, and Z axis accelerometers. The gyroscopes allow the accelerometer data to be corrected for sensor offsets that may be due to the accelerometers physical construction and Newton's Third Law of Motion so that the sensor may output a more accurate inclination angle as measured by the sensor.

While the gyroscopes provide data that may improve accuracy of the determined inclination angle, their readings or output may drift over time. For example, a determined rate of motion by the gyro may increase when the gyro is not moving or is moving at a constant rate due to sensor drift. If the sensor drift increases too far, the accuracy of the sensor's angular rate of change may degrade such that the sensor's accuracy may degrade similar to that of a three axis sensor that does not include gyroscopic correction. The sensor may perform a gyroscopic offset reset whenever the sensor determines it is stationary so that the offset that may be due to drift is removed from the sensor's output data. The sensor may perform the gyroscopic reset whenever the sensor outputs a constant angular rate output. After a reset, the sensor applies an offset that sets the sensor's angular rate output to zero. However, if the sensor reset is performed when the sensor is actually moving at a constant angular rate, the error in the angular rate output of the sensor may increase as if the gyroscope output had drifted without compensation. Therefore, it may be desirable to influence when gyroscopic resets are permitted and/or to perform mitigating actions if a sensor reset is performed when a sensor reset may not be desired.

FIG. 1A shows a side elevation view of machine 100 referenced to coordinate system 150. The vertical axis 151 of coordinate system 150 may be referred to as the Z-axis. The longitudinal axis 152 of coordinate system 150 may be referred to as the X-axis. A gradient angle may lie between the X-axis and the Z-axis as indicated by arrow 155. For example, the gradient angle may be a value of 0° and the gradient angle may increase toward a value of 90° as indicated by arrow 155. Thus, if cab sensor 130 is parallel with earth ground below the drive track 110, the cab sensor 130 may indicate a gradient angle of 0° Likewise, the gradient values of the other sensors may be indicated.

Referring now to FIG. 1B, a plan view of machine 100 is shown to illustrate slew angle. The components described and numbered in FIG. 1A are indicated by the same numbers in FIG. 1B. The plan view of machine 100 is referenced to the coordinate system 150. The longitudinal axis 152 of coordinate system 150 may be referred to as the X-axis. The lateral axis 153 of coordinate system 150 may be referred to as the Y-axis. A slew angle may lie between the X-axis and the Y-axis as indicated by arrow 156. For example, the slew angle may be a value of and the slew angle may increase toward a value of 90° as indicated by arrow 156. Thus, if cab sensor 130 shown in FIG. 1A is parallel with the drive track 110, the cab sensor 130 may indicate a slew angle of 0°. Likewise, the slew angle values of the other sensors may be indicated.

Referring now to FIG. 1C, a rear elevation view of machine 100 is shown to illustrate cant angle. The components described and numbered in FIG. 1A are indicated by the same numbers in FIG. 1C. The rear elevation view of machine 100 is referenced to the coordinate system 150. The vertical axis 151 of coordinate system 150 may be referred to as the Z-axis. The lateral axis 153 of coordinate system 150 may be referred to as the Y-axis. A cant angle may lie between the Z-axis and the Y-axis as indicated by arrow 157. For example, the cant angle may be a value of 0° and the cant angle may increase toward a value of 90° as indicated by arrow 157. Thus, if cab sensor 130 shown in FIG. 1A is perpendicular with the drive track 110 and earth ground, the cab sensor 130 may indicate a cant angle of 0° Likewise, the cant angle values of the other sensors may be indicated. Referring now to FIG. 2, an example control system for machine 100 is shown. Controller 212 may be in electrical communication with actuators 220 and sensors 130-138. The actuators 220 may include hydraulic cylinders as shown in FIGS. 1A-1C, hydraulic pressure control valves to control the hydraulic cylinders, electric machines (e.g., motors), pneumatic machines, etcetera that may adjust operating states of machine 100. Controller 212 may receive data from and supply data to human/machine interface 230 (e.g., a touch panel or display).

Controller 12 may include a processor 202, read-only memory (non-transitory memory) 206, random access memory 208, and inputs/outputs 205 (e.g., digital inputs, digital outputs, analog inputs, analog outputs, counters/timers, and communications ports). Controller 12 may communicate with sensors 130-138 via a controller area network 220. Alternatively, controller 12 may communicate with sensors 130-138 via dedicated analog or digital inputs/outputs. Further, controller 12 may communicate with actuators 220 via controller area network 220 of via dedicated output channels as shown in FIG. 2.

Thus, the system of FIGS. 1A-2 provides for a system for a machine that includes a plurality of sensors, comprising: a plurality of coupled components including at least one sensor coupled to each of the plurality of coupled components; a controller including a non-transitory computer readable medium having executable instructions to characterize operation of the at least one sensor coupled to each of the plurality of coupled components into one state included in a group of states comprising "stationary," "holding," and "active," and executable instructions to adjust a device in response to states of a selected sensor and two other sensors. The system further comprises additional executable instructions to start a timer in response to the states of the selected sensor and the two other sensors. The system further comprises additional executable instructions to deactivate diagnostics for the at least one sensor coupled to each of the plurality of coupled components in response to an angular rate of one sensor changing more than a threshold amount. The system includes where the angular rate of the one sensor changes by more than the threshold amount between two execution cycles of a sensor monitoring algorithm. The system further comprises additional instructions to activate diagnostics for the at least one sensor coupled to each of the plurality of coupled components in response to an angular rate of one sensor changing more than a threshold amount. The system further comprises additional instructions to activate diagnostics for the at least one sensor coupled to each of the plurality of coupled components in further response to an angular rate of motion indicated by one or more of the at least one sensor coupled to each of the plurality of coupled components exceeding a threshold rate. The system further comprises additional instructions to activate diagnostics for the at least one sensor coupled to each of the plurality of coupled components in further response to the machine being stationary for a threshold amount of time.

Referring now to FIGS. 3-7, flowchart of a method for operating a system that includes an array of sensors is shown. The method of FIGS. 3-7 may be incorporated into and may cooperate with the system of FIGS. 1A-2. Further, at least portions of the method of FIGS. 3-7 may be incorporated as executable instructions stored in non-transitory memory of a computing system (e.g., controller 212) while other portions of the method may be performed via the computing system transforming operating states of devices and actuators in the physical world. For example, the computing system may notify an operator or temporarily suspend operation of a machine in response to sensor output. The method of FIGS. 3-7 may be executed via a controller at predetermined time intervals (e.g., every 10 milliseconds).

At 302, method 300 receives or imports data from each sensor in the sensor array. The sensor data may be received via the controller via analog inputs, digital inputs, or serial/parallel or network inputs. The data are imported from the sensors each time method 300 is executed. Thus, for a system that executes method 300 every 10 milliseconds, an amount of time between two adjacent sensor data samples of a same sensor is 10 milliseconds, which may be equal to an amount of time between execution cycles of method 300. Method 300 proceeds to 304.

At 304, method 300 converts inclination angle data from the sensors from their 0-360 degree values to values ranging between −180 degrees to 180 degrees. In one example, the 180 degrees are subtracted from the inclination angle data of each sensor to convert the inclination angle provided by each sensor to the −180 to 180 degree range. Method 300 proceeds to 306.

At 306, method 300 selects data input to the controller from the boom sensor. Method 300 proceeds to 308.

At 308, method 300 judges if the presently selected sensor has been mounted upside down. In one example, method 300 may judge that the selected sensor is mounted upside down based on a configuration that is input to the controller via an engineer performing a class configuration for the particular machine or vehicle model. If method 300 judges that the presently selected sensor has been mounted upside down, then the answer is yes and method 300 proceeds to 310. Otherwise, the answer is no and method 300 proceeds to 312.

At 310, method 300 inverts the angular rate values for the presently selected sensor. In one example, method 300 inverts the angular rate values via defining OutAngleInplane=−InAngleInplane, where InAngleInplane is data from the sensor of a plane and OutAngleInplane is the adjusted angular rate value. Method 300 proceeds to 312.

At 312, method 300 converts angular rates in the selected sensor's local sensor coordinate system to the angular rates in the global machine coordinate system. The selected sensor outputs angular rates about each of its X, Y, and Z axes. The angular rates for the selected sensor may be determined via the following matrix equations:

$$\begin{bmatrix} X_{Global} \\ Y_{Global} \\ Z_{Global} \end{bmatrix} = \begin{bmatrix} \cos(\theta) & -\sin(\theta) & 0 \\ \sin(\theta)\cdot\cos(\varphi) & -\cos(\theta)\cdot\sin(\varphi) & -\sin(\varphi) \\ \sin(\theta)\cdot\sin(\varphi) & -\cos(\theta)\cdot\sin(\varphi) & \cos(\varphi) \end{bmatrix} \cdot \begin{bmatrix} X_{Local} \\ Y_{Local} \\ Z_{Local} \end{bmatrix}$$

$$A = \begin{bmatrix} X_{Global} \\ Y_{Global} \\ Z_{Global} \end{bmatrix} = \text{Output Matrix}$$

$$B = \begin{bmatrix} \cos(\theta) & -\sin(\theta) & 0 \\ \sin(\theta)\cdot\cos(\varphi) & -\cos(\theta)\cdot\sin(\varphi) & -\sin(\varphi) \\ \sin(\theta)\cdot\sin(\varphi) & -\cos(\theta)\cdot\sin(\varphi) & \cos(\varphi) \end{bmatrix} = \text{translation matrix}$$

$$C = \begin{bmatrix} X_{Local} \\ Y_{Local} \\ Z_{Local} \end{bmatrix} = \text{Input Matrix}$$

where $\theta$ is gradient angle and $\varphi$ is the cant angle, $X_{Global}$ is the machine's or vehicle's X axis, $Y_{Global}$ is the machine's or vehicle's Y axis, and $Z_{Global}$ is the machine's or vehicle's Z axis, $X_{Local}$ is the selected sensor's X axis, $Y_{Local}$ is the selected sensor's Y axis, and $Z_{Local}$ is the selected sensor's Z axis. Method 300 proceeds to 314.

At 314, method 300 judges if output of all the sensors has been converted to the machine's global coordinate system. If so, the answer is yes and method 300 proceeds to 316. Otherwise, the answer is no and method 300 proceeds to 309.

At 309, method 300 selects a next sensor to convert coordinates. For example, if the angular rates of the cab position sensor have been converted to the global machine coordinates, then the boom sensor's output data may be converted next. Method 300 returns to 308.

At 316, method 300 selects angular data from the boom sensor. Method 300 proceeds to 318.

At 318, method 300 converts angular rates in the machine's or vehicle's X, Y, and Z axes to gradient angular rate, cant angular rate, and slew angular rate. The angular rates for the selected sensor may be determined via the following matrix equations:

$$\begin{bmatrix} G_{\text{angular\_rate}} \\ C_{\text{angular\_rate}} \\ S_{\text{angular\_rate}} \end{bmatrix} = \begin{bmatrix} \sin(\gamma) & 0 & \cos(\gamma) \\ \cos(\gamma) & 0 & \sin(\gamma) \\ 0 & 1 & 0 \end{bmatrix} \cdot \begin{bmatrix} X_{Global} \\ Y_{Global} \\ Z_{Global} \end{bmatrix}$$

$$A = \begin{bmatrix} G_{\text{angular\_rate}} \\ C_{\text{angular\_rate}} \\ S_{\text{angular\_rate}} \end{bmatrix} = \text{Output Matrix}$$

$$B = \begin{bmatrix} \sin(\gamma) & 0 & \cos(\gamma) \\ \cos(\gamma) & 0 & \sin(\gamma) \\ 0 & 1 & 0 \end{bmatrix} = \text{translation matrix}$$

-continued $$C = \begin{bmatrix} X_{Global} \\ Y_{Global} \\ Z_{Global} \end{bmatrix} = \text{Input matrix}$$

where $\gamma$ is slew angle, $G_{angular\_rate}$ is the machine's or vehicle's gradient angular rate, $C_{angular\_rate}$ is the machine's or vehicle's cant angular rate, and $S_{angular\_rate}$ is the machine's or vehicle's slew angular rate. Method 300 proceeds to 320.

At 320, method 300 judges if axis angular rates have been converted to Gradient, cant, and slew. If so, the answer is yes and method 300 proceeds to 322. Otherwise, the answer is no and method 300 proceeds to 319.

At 319, method 300 selects a next sensor to convert coordinates. For example, if the global angular rates for a boom sensor have been converted to gradient, cant, and slew, then the boom sensor's output data may be converted next. Method 300 returns to 318.

At 322, method 300 determines the cab inclination angle. The boom is compared to the angle of the machine cab (e.g., the boom's reference component) to determine if the boom inclination sensor output is within a bounded range. Reference components are components that are positioned closest upstream to the component that includes the selected sensor. The reference component's sensor is used to determine if the selected sensor is reporting outside physical limits of the component that is downstream of the reference component. To accomplish this, a relative angle is determined between two components. Thus, The cab angle may be determined via the following equation:

CabInclinationAngle=AngGradient×cos(γ)+AngCant× sin(γ)

where CabInclinationAngle is the cab inclination angle, AngGradient is the gradient angle, and AngCant is the cant angle, the AngGradient and AngCant parameter values may be directly imported via the selected sensor. Method 300 proceeds to 324.

At 324, method 300 selects data input to the controller from the boom sensor. Method 300 proceeds to 326.

At 326, method 300 determines the angular rate of the selected sensor from the selected sensor's inclination angle data. The selected sensor's inclination angle data may range from −180 to 180 degrees after the selected sensor's inclination angle data has been converted from a 0-360 degree range. Method 300 may retrieve the selected sensor's inclination angle data from step 304 of FIG. 3. Method 300 proceeds to 328.

At 328, method 300 judges if the inclination sensor angular rate is greater than a first threshold (e.g., a moving threshold of 7.5 degrees/second). If so, the answer is yes and method 300 proceeds to 329. Otherwise, the answer is no and method 300 proceeds to 330.

At 329, method 300 sets the component state to "active." For example, if the selected sensor is a boom sensor, and the boom angular rate is greater than 7.5 degrees/second, then the state of the boom may be set to "active." Method 300 proceeds to 334.

At 330, method 300 judges if the inclination sensor angular rate is greater than a second threshold (e.g., a moving threshold of 1.1 degrees/second). If so, the answer is yes and method 300 proceeds to 331. Otherwise, the answer is no and method 300 proceeds to 332.

At 331, method 300 sets the component state to "holding." For example, if the selected sensor is a boom sensor, and the boom angular rate is less than 7.5 degrees/second and greater than 1.1 degrees/second, then the state of the boom may be set to "holding." Method 300 proceeds to 334.

At 332, method 300 sets the component state to "stationary." For example, if the sensor is a boom sensor, and the boom angular rate is less than 1.1 degrees/second, then the state of the boom may be set to "stationary." Method 300 proceeds to 332.

At 334, method 300 determines if component states for all sensors have been determined. If so, the answer is yes and method 300 proceeds to 336. Otherwise, the answer is no and method 300 proceeds to 335.

At 335, method 300 selects a next sensor for which the next sensor's inclination angular rate is to be classified as "active," "stationary," or "holding." For example, if the inclination angle for the boom sensor has been determined, then the next sensor's output data to be classified may be the artic sensor's output data. Method 300 returns to 326.

At 336, method 300 selects data input to the controller from the boom sensor. Method 300 proceeds to 338.

At 338, method 300 determines the angular rate of the selected sensor from the selected sensor's cant angle data. Method 300 may retrieve the selected sensor's cant angle data from step 302 of FIG. 3. Method 300 proceeds to 340.

At 340, method 300 judges if the selected sensor's cant angular rate is greater than a first threshold (e.g., a moving threshold of 8.5 degrees/second). If so, the answer is yes and method 300 proceeds to 342. Otherwise, the answer is no and method 300 proceeds to 341.

At 341, method 300 sets the component state to "active." For example, if the selected sensor is a boom sensor, and the boom angular rate is greater than 8.5 degrees/second, then the state of the boom may be set to "active." Method 300 proceeds to 346.

At 342, method 300 judges if the selected sensor's cant angular rate is greater than a second threshold (e.g., a moving threshold of 0.2 degrees/second). If so, the answer is yes and method 300 proceeds to 343. Otherwise, the answer is no and method 300 proceeds to 344.

At 343, method 300 sets the component state to "holding." For example, if the selected sensor is a boom sensor, and the boom cant angular rate is less than 8.5 degrees/second and greater than 0.2 degrees/second, then the state of the boom cant may be set to "holding." Method 300 proceeds to 346.

At 344, method 300 sets the component state to "stationary." For example, if the selected sensor is a boom cant sensor, and the boom cant angular rate is less than 1.1 degrees/second, then the state of the boom cant sensor may be set to "stationary." Method 300 proceeds to 346.

At 346, method 300 determines if component states for all planes have been determined. For example, method 300 judges if cant, slew, and gradient angular rates have been characterized as "stationary," "holding," or "active." If so, the answer is yes and method 300 proceeds to 348. Otherwise, the answer is no and method 300 proceeds to 347.

At 347, method 300 selects a next plane for which the selected sensor's plane angular rate is to be classified as "active," "stationary," or "holding." For example, if the cant angle for the boom sensor has been characterized as "active," "stationary," or "holding," then the slew rate of the boom sensor's output data may be selected to be characterized next. Method 300 returns to 340.

At 348, method 300 judges if component states have been determined for all sensors. If so, the answer is yes and method 300 proceeds to 350. Otherwise, the answer is no and method 300 proceeds to 349. For example, if the component states for the boom sensor have been characterized as "holding," "stationary," or "active," then the arm sensor's output data may be selected for characterizing as "holding," "stationary," or "active."

At 349, method 300 selects a next sensor for evaluating component states. For example, if the present sensor is a boom sensor, the next sensor may be an artic sensor. Method 300 returns to 338.

At 350, method 300 selects data input to the controller from the boom sensor. Method 300 proceeds to 352.

Figure 4:
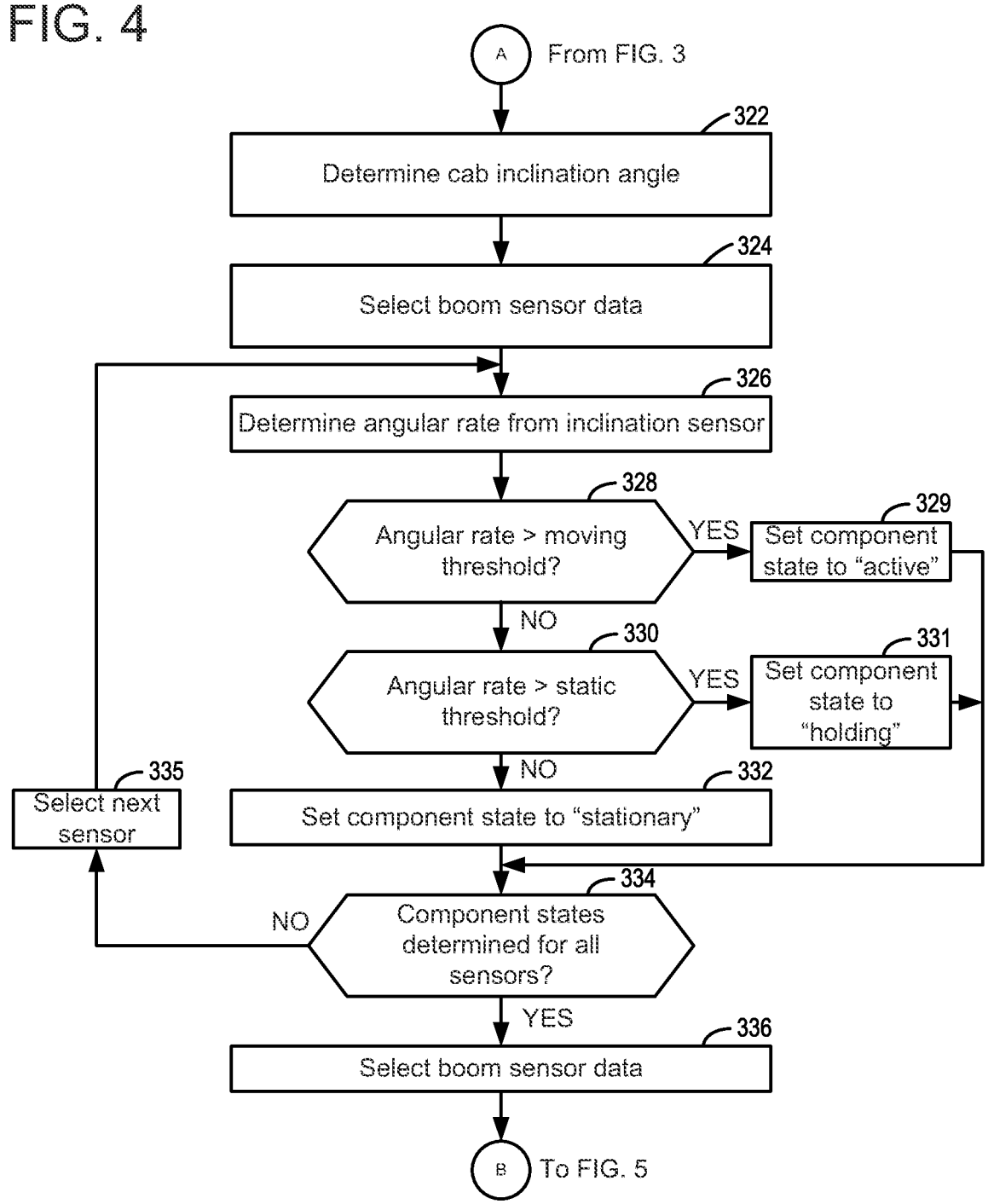
Figure 5:
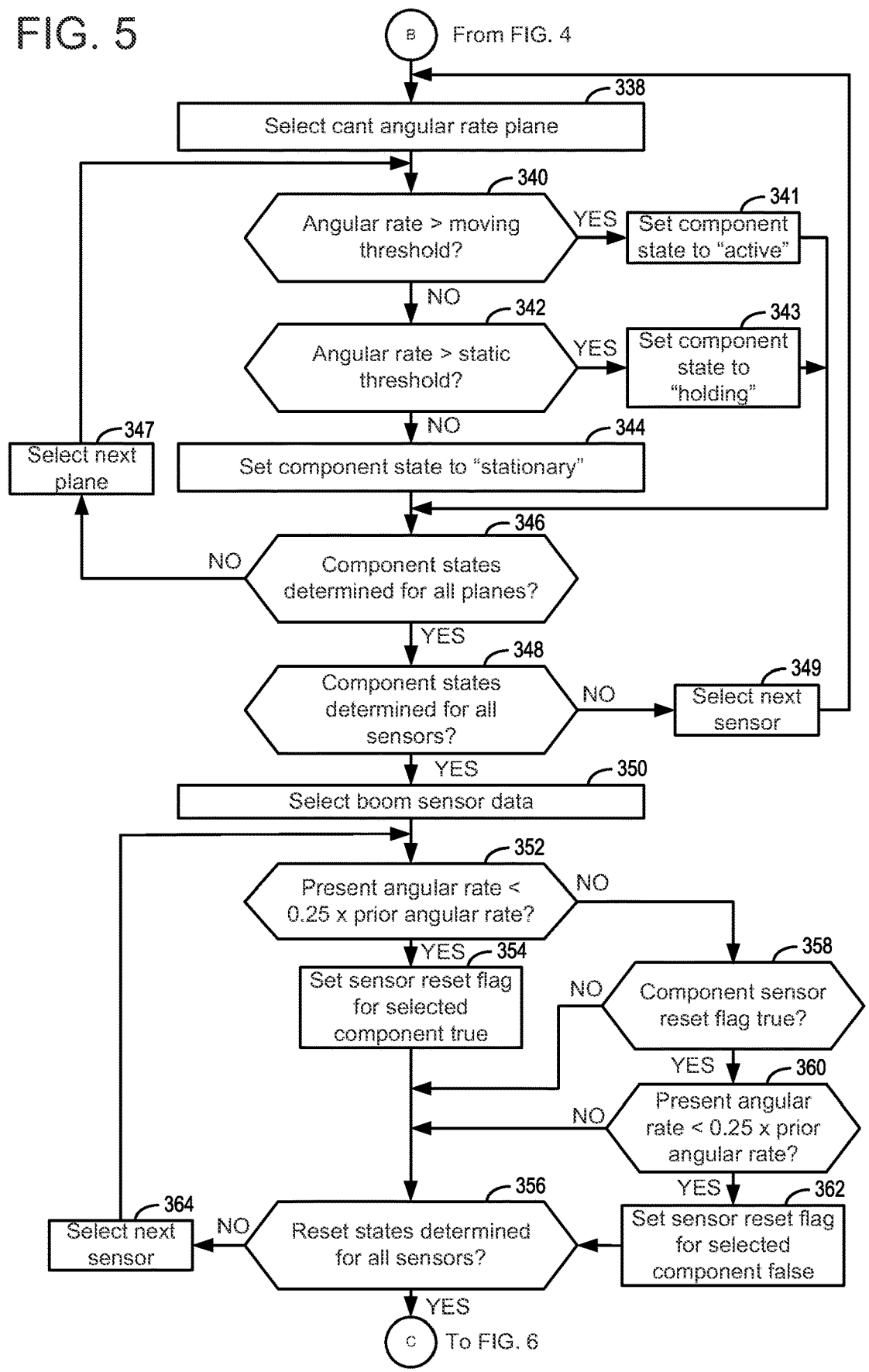
Figure 6:
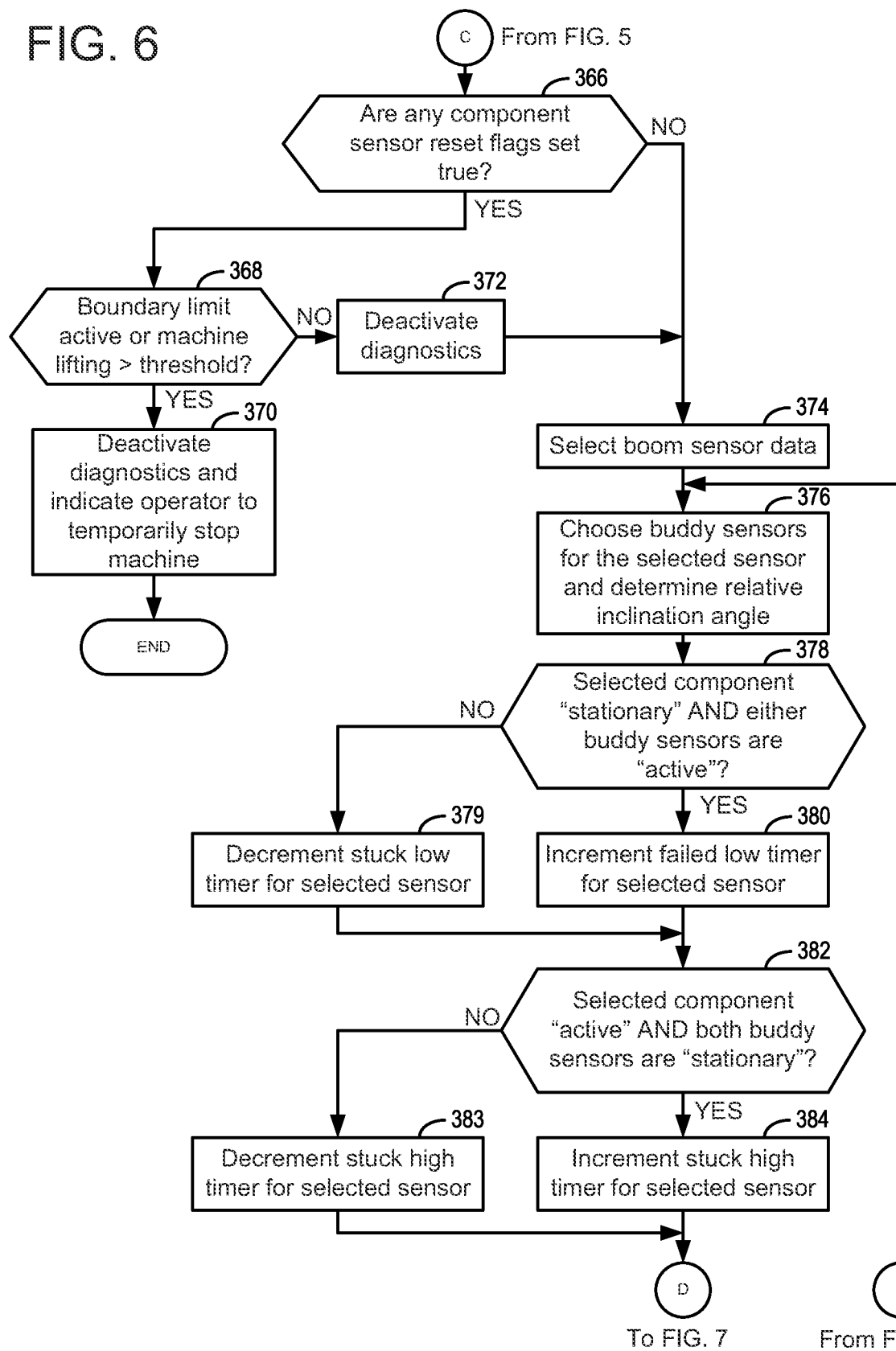
Figure 7:
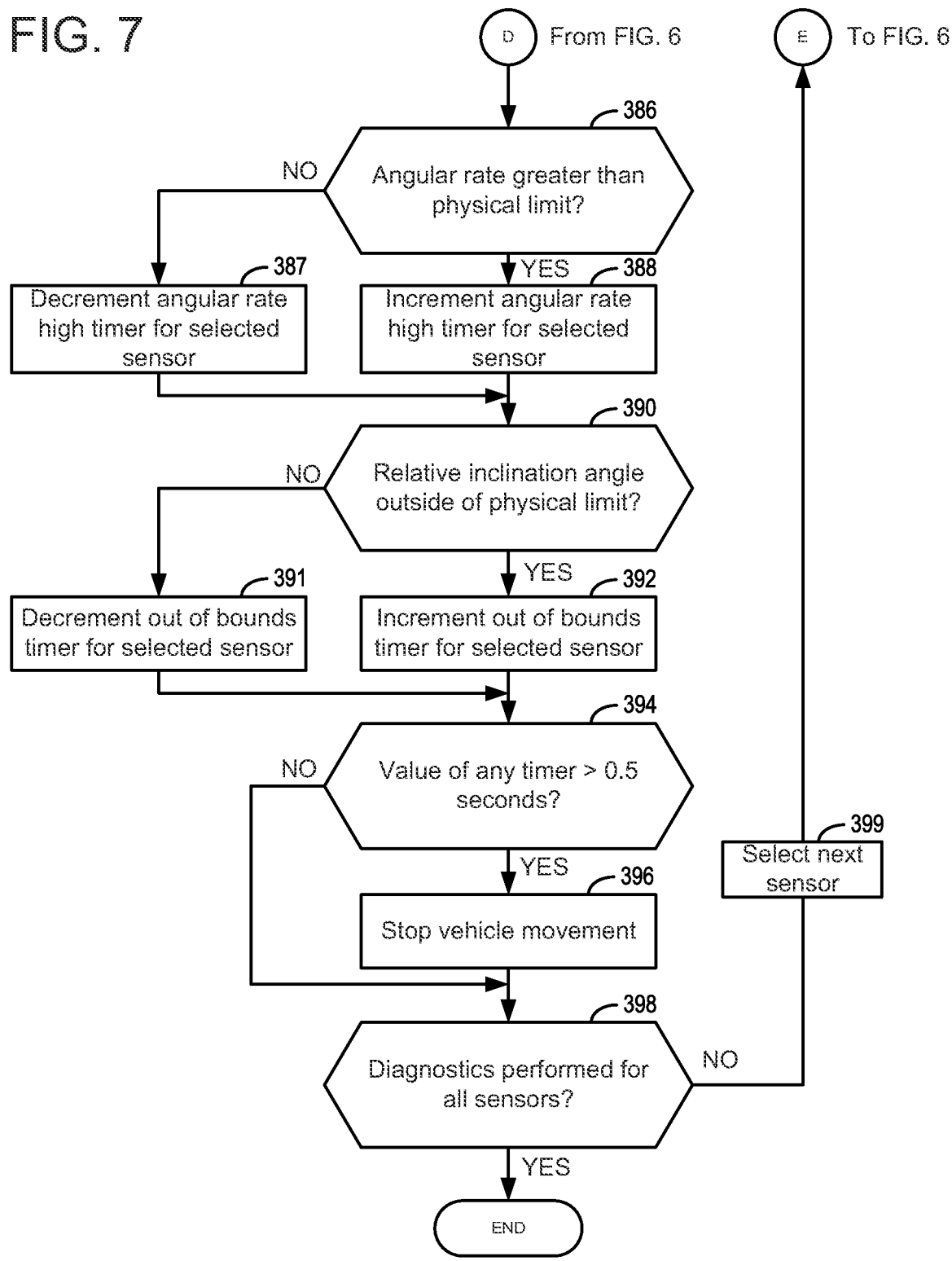

At 352, method 300 judges if a present angular rate, as determined at 326 of FIG. 4, of the selected sensor is less than 25% of an immediately prior angular rate of the selected sensor. If so, the answer is yes and method 300 proceeds to 354. Otherwise, the answer is no and method 300 proceeds to 358. Method 300 evaluates the angular rate of the selected sensor to determine if the angular rate of the selected sensor has change by more than 75% of its value in one time step (e.g., a time between execution intervals of the controller that monitors operating states of the sensors in the sensor network). Such operation of the sensor may be indicative of the sensor being internally reset. Further, method 300 may require that the angular rate is greater than a predetermined number of degrees (e.g., 5 degrees/second) to establish that a sensor reset has occurred.

At 354, method 300 sets a sensor reset flag (e.g., a word in controller memory) is set to a Boolean true state to indicate that the selected sensor being evaluated has experienced an internal reset. The internal reset may be activated as previously mentioned to improve sensor accuracy when the sensor determines that it is not moving according to gyro output. Method 300 proceeds to 356.

At 358, method 300 judges if the selected sensor reset flag is set to a true state. If so, the answer is yes and method 300 proceeds to 360. Otherwise, the answer is no and method 300 proceeds to 356.

At 360, method 300 judges if the present angular rate of the selected sensor is less than 25% of the selected sensor's immediately prior angular rate value. If so, the answer is yes and method 300 proceeds to 362. Otherwise, the answer is no and method 300 proceeds to 356. Further, method 300 may also require that the angular rate is greater than a predetermined number of degrees (e.g., 5 degrees/second) and the machine has been stationary for a predetermined amount of time to establish that a sensor reset has occurred. In other words, at 360 if the angular rate of the selected sensor indicates a reset after the reset determined at 352, then it may be determined that the present reset is a corrective reset by the selected sensor and that the selected sensor is fully operational again.

At 362, method 300 sets the selected sensor's reset flag to a state of false. Method 300 proceeds to 356.

At 356, method 300 judges if reset states for all sensors (e.g., cab, boom, artic, arm, and tool) have been determined. Method 300 may internally track which sensors have been evaluated for resets. If method 300 judges that reset states for all sensors have been determined, the answer is yes and method 300 proceeds to 366. Otherwise, method 300 proceeds to 364.

At 364, method 300 selects a next sensor for evaluating component states. For example, if the present sensor is a boom sensor, the next sensor may be an artic sensor. Method 300 returns to 352.

At 366, method 300 judges if any of the component reset flags are set true. If so, the answer is yes and method 300 proceeds to 368. Otherwise, the answer is no and method 300 proceeds to 374. One of the component flags of a selected sensor in the sensor array may be set true when gradient motion, slew motion, or cant motion for a selected sensor in the sensor array changes by more than 75% of its previous value between executions of the present method as previously described.

At 368, method 300 judges if a boundary limit is active or if the machine is lifting greater than a threshold amount of weight. If so, the answer is yes and method 300 proceeds to 370. Otherwise, the answer is no and method 300 proceeds to 372. The boundary limits may be input via a machine operator or they may be preprogrammed via the machine's manufacturer. The boundary limits may require that threshold angular velocities of slew, cant, and gradient not be exceeded so that desired machine operation may be provided. Further, the boundary limits may include thresholds that limit vehicle cant and gradient values so that desired machine operation may be provided.

At 370, method 300 deactivates sensor diagnostics and notifies a machine operator to temporarily stop the machine. The machine operator may be notified via a human/machine interface, audible sound, or other means. In some examples, the controller may cease machine movement via commanding one or more actuators (e.g., electric machines, hydraulic cylinders, etc.) to cease movement of the machine. Alternatively, the machine may be moved to a predetermined position at a predetermined rate of speed when boundary limits have been exceeded. The sensor diagnostics are temporarily deactivated so that sensor output errors may not be increased. By fully stopping the machine via the operator or via the controller, each sensor may be reset to remove offset errors from each of the respective sensors. The machine may resume operation after each sensor has been reset. Specifying the sensor reset may reduce the possibility of the sensors outputting data that may be less reliable than may be desired. In still other examples, the machine may be allowed to continue to operate, but at a lower capacity. For example, the machine may not be permitted to rotate above a predetermined speed. Method 300 proceeds to exit.

At 372, method 300 temporarily deactivates sensor diagnostics. The sensor diagnostics may be temporarily deactivated because the inclination sensor data may not be as reliable as may be desired. Deactivating the sensor diagnostics may reduce a possibility of false positive errors. Method 300 proceeds to 374.

At 374, method 300 selects data input to the controller from the boom sensor. Method 300 proceeds to 376. Sensor diagnostics may begin by selecting an initial sensor to evaluate, such as the boom sensor.

At 376, method 300 chooses "buddy" sensors for the selected sensor and determines a relative inclination angle. The relative inclination angle is an angle that is between two components. In one example, method 300 selects two sensors that are positioned immediately downstream of the selected sensor according to a direction of power flow through the machine to be "buddy" sensors to the selected sensor. Thus, if the boom sensor is the selected sensor, then the artic sensor and the arm sensor may be selected to be "buddy" sensors with the boom sensor. If this is not possible, method 300 may select the next available sensors downstream of the selected sensor as "buddy" sensors. If it is not possible to find two "buddy" sensors downstream of the selected sensor, then method 300 may select a sensor that is immediately upstream of the selected sensor. If the selected sensor is located at an end of the machine's torque or energy transfer mechanism (e.g., the tool sensor of FIG. 1A), then one "buddy" sensor may be located upstream of the selected sensor and angular rate of a gyro of the selected sensor may be used in place of a second "buddy" sensor. The relative inclination angle may be determined via the following equation:

RelIncAng=Ref ComIncAng−IncAngSS where RelIncAng is the relative inclination angle between components, RefComIncAng is the reference component inclination angle, and IncAngSS is the inclination angle of the selected sensor. Method 300 proceeds to 378.

At 378, method 300 judges if the selected component is characterized as "stationary" and either of the selected sensor's buddy sensors are characterized as "active," then the answer is yes and method 300 proceeds to 380. Otherwise, method 300 proceeds to 379. In this way, method 300 determines if the sensor of the selected component (e.g., the boom sensor) is indicating no or very low level or rate of movement and at least one of its "buddy" sensors is indicating a relatively high level or rate of movement. Such conditions may indicate that the selected sensor is outputting angular data that may be less than is expected, thereby indicating that the selected sensor may be degraded (e.g., the selected sensor may not be outputting expected values).

At 379, method 300 decrements a value of a stuck low timer that is associated with the selected sensor. For example, if a stuck low timer value is 0.1 and the time decrement is 0.01 seconds, then the value in the stuck low timer may be revised to 0.09. The stuck low timer may be a timer that is in controller memory and it may reflect an amount of time that output of a selected sensor is low without output of its "buddy" sensors being low. Method 300 proceeds to 382.

At 380, method 300 increments a value of the stuck low timer that is associated with the selected sensor. For example, if a stuck low timer value is 0.1 and the time increment is 0.01 seconds, then the value in the stuck low timer may be revised to 0.11. The stuck low timer may be a timer that is in controller memory and it may reflect an amount of time that output of a selected sensor is low without output of its "buddy" sensors being low. Method 300 proceeds to 382.

At 382, method 300 judges if the selected component is characterized as "active" and both of the selected sensor's buddy sensors are characterized as "stationary," then the answer is yes and method 300 proceeds to 384. Otherwise, method 300 proceeds to 383. In this way, method 300 determines if the sensor of the selected component (e.g., the boom sensor) is indicating a high level or rate of movement and both of its "buddy" sensors are indicating a high level or rate of movement. If so, such conditions may indicate that the selected sensor is outputting angular data that may be greater than is expected, thereby indicating that the selected sensor may be degraded (e.g., the selected sensor may not be outputting expected values).

At 383, method 300 decrements a value of a stuck high timer that is associated with the selected sensor. For example, if a stuck high timer value is 0.1 and the time decrement is 0.01 seconds, then the value in the stuck high timer may be revised to 0.09. The stuck high timer may be a timer that is in controller memory and it may reflect an amount of time that output of a selected sensor is high without output of its "buddy" sensors being high. Method 300 proceeds to 386.

At 384, method 300 increments a value of the stuck high timer that is associated with the selected sensor. For example, if a stuck high timer value is 0.1 and the time increment is 0.01 seconds, then the value in the stuck high timer may be revised to 0.11. The stuck high timer may be a timer that is in controller memory and it may reflect an amount of time that output of a selected sensor is high without output of its "buddy" sensors being high. Method 300 proceeds to 386.

At 388, method 300 judges if the angular rate of motion of the selected sensor is greater than a predetermined physical limit (e.g., 10 degrees/second). If so, the answer is yes and method 300 proceeds to 388. Otherwise, method 300 proceeds to 387. In this way, method 300 determines if the sensor of the selected component (e.g., the boom sensor) is indicating a higher angular motion rate than may be realized by the component associated with the selected sensor. Such conditions may indicate that the selected sensor is outputting angular data that may be greater than is realizable, thereby indicating that the selected sensor may be degraded (e.g., the selected sensor may not be outputting expected values).

At 387, method 300 decrements a value of an angular rate high timer that is associated with the selected sensor. For example, if an angular rate high timer value is 0.1 and the time decrement is 0.01 seconds, then the value in the angular rate high timer may be revised to 0.09. The angular rate high timer may be a timer that is in controller memory and it may reflect an amount of time that output of a selected sensor is higher than may be expected. Method 300 proceeds to 390.

At 388, method 300 increments a value of the angular rate high timer that is associated with the selected sensor. For example, if an angular rate high timer value is 0.1 and the time increment is 0.01 seconds, then the value in the angular rate high timer may be revised to 0.11. Method 300 proceeds to 390.

At 390, method 300 judges if the inclination angle of the selected sensor is greater than a predetermined physical limit (e.g., 180 degrees). If so, the answer is yes and method 300 proceeds to 392. Otherwise, method 300 proceeds to 391. In this way, method 300 determines if the sensor of the selected component (e.g., the boom sensor) is indicating a higher inclination angle than may be realized by the component associated with the selected sensor. Such conditions may indicate that the selected sensor is outputting inclination angle data that may be greater than is realizable, thereby indicating that the selected sensor may be degraded (e.g., the selected sensor may not be outputting expected values).

At 391, method 300 decrements an out of bounds timer that is associated with the selected sensor. For example, if an out of bounds timer value is 0.1 and the time decrement is 0.01 seconds, then the value in the out of bounds timer may be revised to 0.09. The out of bounds timer may be a timer that is in controller memory and it may reflect an amount of time that output of a selected sensor is not within an expected range. Method 300 proceeds to 394.

At 392, method 300 increments a value of the out of bounds timer that is associated with the selected sensor. For example, if the out of bounds timer value is 0.1 and the time increment is 0.01 seconds, then the value in the out of bounds timer may be revised to 0.11. Method 300 proceeds to 394.

At 394, method 300 judges if any of the timers previously mentioned have a value greater than a predetermined value. For example, method 300 may judge if the timers have a value greater than 0.5 seconds. If so, the answer is yes and method 300 proceeds to 396. Otherwise, the answer is no and method 300 proceeds to 398.

At 396, method 300 may command machine or vehicle actuators to cease movement of the vehicle or machine. In one example, method 300 may command hydraulic cylinders, electric machines, or pneumatic devices to cease movement, thereby ceasing movement of the machine or vehicle. In addition, method 300 may notify the vehicle or machine operator that diagnostics have indicated sensor degradation via a human/machine interface. In other examples, the machine may be allowed to continue to operate, but at a lower capacity. For example, the machine may not be permitted to rotate above a predetermined speed. Method 300 proceeds to 398.

At 398, method 300 judges if diagnostics for all sensors have been performed. If so, the answer is yes and method 300 proceeds to exit. Otherwise, the answer is no and method 300 proceeds to 399.

At 399, method 300 selects a next sensor for evaluating component states. For example, if the present sensor is a boom sensor, the next sensor may be an artic sensor. Method 300 returns to 376.

In this way, operation of sensors that are a part of a sensor array may be evaluated. If sensor output is out of range or is inconsistent with "buddy" sensors, then operation of the machine or vehicle may be ceased or reduced in capacity.

Thus, the method of FIGS. 3-7 provides for a method for operating a system that includes an array of sensors, comprising: characterizing operation of a first sensor as being in one of a plurality of sensor states via a controller; characterizing operation of each of a plurality of sensors as being in one of the plurality of sensor states via the controller; and indicating the first sensor is degraded via the controller in response to the first sensor being in one of the plurality of sensor states and at least one of the plurality of sensors being in a different state than the one of the plurality of sensor states. The indication may be provided via a device such as a human/machine interface or via stopping or reducing capacity of a machine via adjusting operation of actuators of the machine. The method includes where the plurality of sensors comprises an actual total of two sensors. The method includes where the plurality of sensor states include "stationary," "holding," and "active." The method includes where the first sensor is in a "stationary" state, and where the at least one of the plurality of sensors is in an "active" state. The method includes where the plurality of sensor states are based on angular motion. The method includes where the plurality of sensors are "buddy" sensors that are located along a path of power transfer between coupled components. The method includes where the "buddy" sensors are located downstream of the first sensor according to a direction of power transfer through the coupled components. The method includes where indicating includes adjusting an operating state of a device.

The method of FIGS. 3-7 also provides for a method for operating a system that includes an array of sensors, comprising: deactivating diagnostics of the array of sensors in response to a sensor output changing by more than a threshold amount between execution cycles of a sensor monitoring algorithm; and activating diagnostics of the array of sensors in response to the sensor output changing by more than the threshold amount between execution cycles of the sensor monitoring algorithm after the diagnostics of the array of sensors have been deactivated. The diagnostics evaluate whether or not sensors in the array of sensors operate in an expected way. The method further comprises deactivating the diagnostics of the array of sensors in further response to an angular rate indicated by the sensor output exceeding a predetermined value.

In some examples, the method further comprises activating the diagnostics of the array of sensors in further response to an angular rate indicated by the sensor output exceeding a predetermined value. The method further comprising activating the diagnostics of the array of sensors in further response to a machine being stationary for a predetermined amount of time. The method further comprises providing an indication to an operator of a machine in response to a boundary limit of the machine being exceeded after deactivating the diagnostics.

Figure 8:
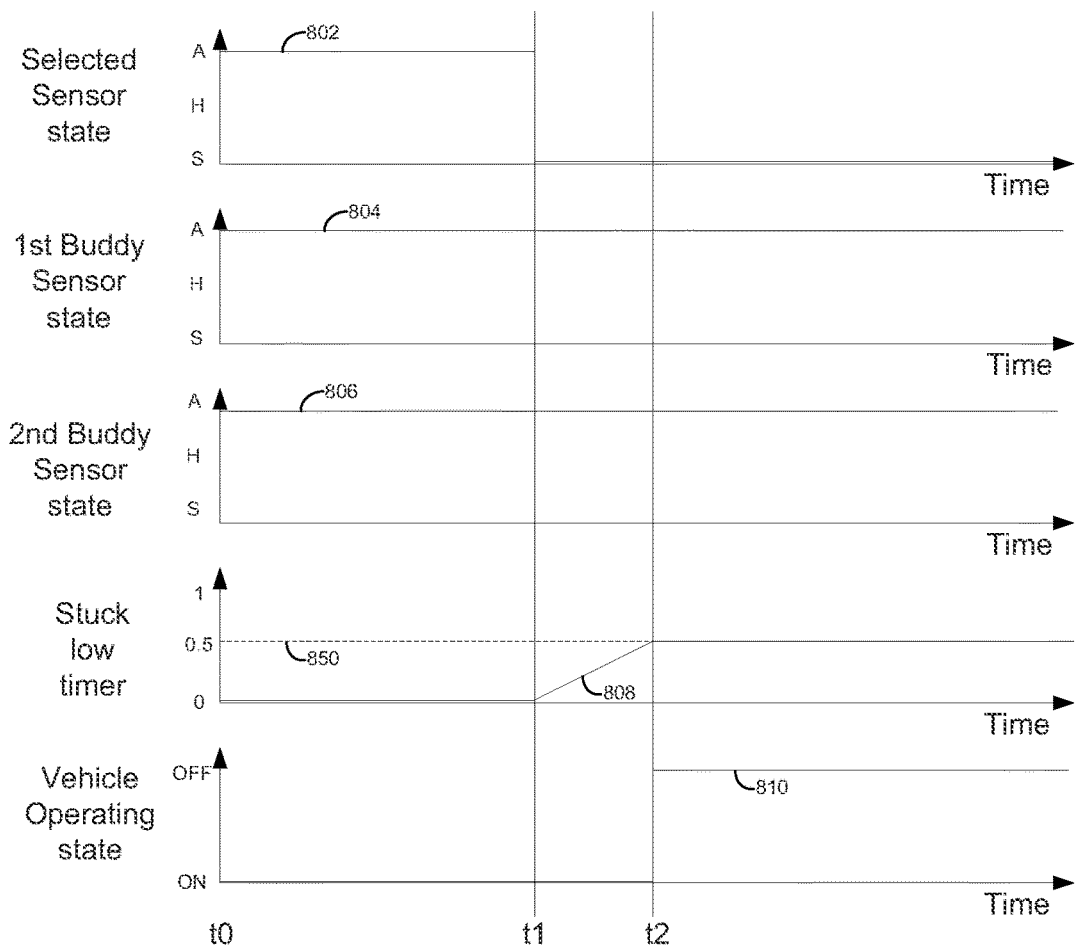
FIGS. 8-13 show example operating sequences according to the method of FIGS. 3-7 and the system of FIGS. 1A-2.

Referring now to FIG. 8, an example operating sequence that may be provided via the system of FIGS. 1A-2 in cooperation with the method of FIGS. 3-7 is shown. In particular, FIG. 8 shows an example operating sequence where output of a selected sensor is lower than may be expected. The plots of FIG. 8 are aligned in time and occur at the same time.

The first plot from the top of FIG. 8 is a plot of an operating state of a selected sensor versus time. The vertical axis represents the state of the selected sensor (e.g., a boom sensor) and the sensor is in an "active" state when trace 802 is at the level of "A." The sensor is in a "holding" state when trace 802 is at a level of "H." The sensor is in a "stationary" state when trace 802 is at a level of "S." The horizontal axis represents time and time increases from the left side of the figure to the right side of the figure. Trace 802 represents the state of the selected sensor.

The second plot from the top of FIG. 8 is a plot of an operating state of a first buddy sensor versus time. The vertical axis represents the state of the first buddy sensor (e.g., an artic sensor) and the first "buddy" sensor is in an "active" state when trace 804 is at the level of "A." The first buddy sensor is in a "holding" state when trace 804 is at a level of "H." The first "buddy" sensor is in a "stationary" state when trace 804 is at a level of "S." The horizontal axis represents time and time increases from the left side of the figure to the right side of the figure. Trace 804 represents the state of the first "buddy" selected sensor.

The third plot from the top of FIG. 8 is a plot of an operating state of a second buddy sensor versus time. The vertical axis represents the state of the second buddy sensor (e.g., an arm sensor) and the second "buddy" sensor is in an "active" state when trace 806 is at the level of "A." The second buddy sensor is in a "holding" state when trace 806 is at a level of "H." The second "buddy" sensor is in a "stationary" state when trace 806 is at a level of "S." The horizontal axis represents time and time increases from the left side of the figure to the right side of the figure. Trace 806 represents the state of the second "buddy" selected sensor.

The fourth plot from the top of FIG. 8 is a plot of a value stored in a stuck low timer versus time. The vertical axis represents an amount of time that is accumulated in the stuck low timer and the amount of time increases in the direction of the vertical axis arrow. The horizontal axis represents time and time increases from the left side of the figure to the right side of the figure. Trace 808 represents the amount of time that is stored in the stuck low timer. Horizontal line 850 represents a threshold amount of time that when exceeded by the stuck low timer causes mitigating actions to be taken (e.g., temporarily deactivate the vehicle or machine).

The fifth plot from the top of FIG. 8 is a plot of a vehicle or machine operating state versus time. The vertical axis represents the operating state of the vehicle or machine. The vehicle or machine is on or operating when trace 810 is at a lower level near the horizontal axis. The vehicle or machine is off or not operating when trace 810 is at a higher level near the vertical axis arrow. Trace 810 represents the operating state of the vehicle or machine. The horizontal axis represents time and time increases from the left side of the figure to the right side of the figure.

At time t0, the selected sensor state, state of the $1^{st}$ buddy sensor of the selected sensor, and state of the $2^{nd}$ buddy sensor of the selected buddy sensor are all indicating "active" states. The stuck low timer value is zero and the vehicle is operating.

At time t1, the selected sensor state transitions to "stationary" while the states of the state of the 1$^{st}$ buddy sensor of the selected sensor and the state of the 2$^{nd}$ buddy sensor of the selected buddy sensor are indicating "active." Thus, the selected sensor output becomes degraded as compared to its expected output. The value in the stuck low timer begins to increase and the vehicle remains activated.

At time t2, the value in the stuck low timer exceeds threshold 850, which causes the vehicle to be deactivated. The selected sensor state remains "stationary" while the states of the state of the 1$^{st}$ buddy sensor of the selected sensor and the state of the 2$^{nd}$ buddy sensor of the selected buddy sensor are indicating "active."

In this way, outputs of two or more sensors may be characterized according to motion of the sensors and an indication of degradation of a selected sensor may be based on characterizations of the sensors. If a selected sensor is indicated as degraded, the vehicle or machine may stop moving or its movement may be limited such that it is only permitted to operate at a fraction of its maximum speed.

Figure 9:
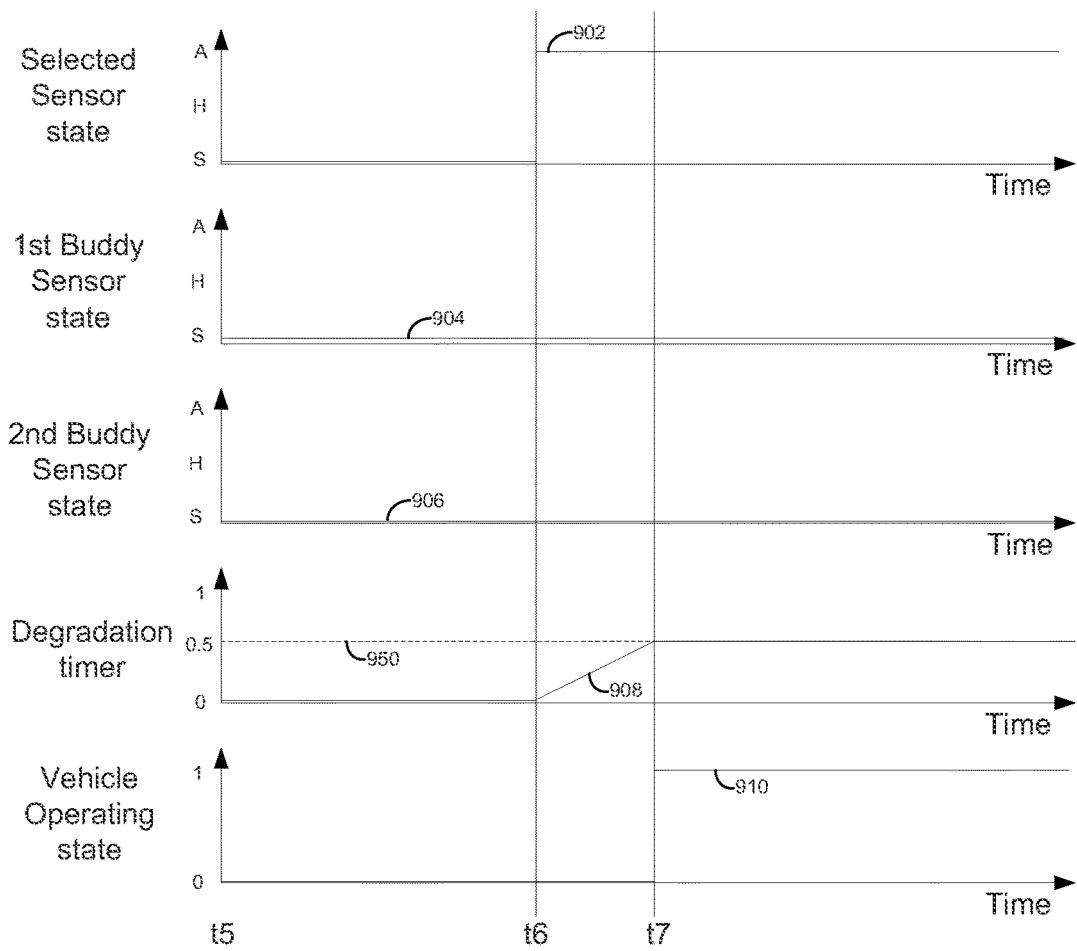

Referring now to FIG. 9, an example operating sequence that may be provided via the system of FIGS. 1A-2 in cooperation with the method of FIGS. 3-7 is shown. In particular, FIG. 9 shows an example operating sequence where output of a selected sensor is higher than may be expected. The plots of FIG. 9 are aligned in time and occur at the same time.

The first plot from the top of FIG. 9 is a plot of an operating state of a selected sensor versus time. The vertical axis represents the state of the selected sensor (e.g., a boom sensor) and the sensor is in an "active" state when trace 902 is at the level of "A." The sensor is in a "holding" state when trace 902 is at a level of "H." The sensor is in a "stationary" state when trace 902 is at a level of "S." The horizontal axis represents time and time increases from the left side of the figure to the right side of the figure. Trace 902 represents the state of the selected sensor.

The second plot from the top of FIG. 9 is a plot of an operating state of a first buddy sensor versus time. The vertical axis represents the state of the first buddy sensor (e.g., an artic sensor) and the first "buddy" sensor is in an "active" state when trace 904 is at the level of "A." The first buddy sensor is in a "holding" state when trace 904 is at a level of "H." The first "buddy" sensor is in a "stationary" state when trace 904 is at a level of "S." The horizontal axis represents time and time increases from the left side of the figure to the right side of the figure. Trace 904 represents the state of the first "buddy" selected sensor.

The third plot from the top of FIG. 9 is a plot of an operating state of a second buddy sensor versus time. The vertical axis represents the state of the second buddy sensor (e.g., an arm sensor) and the second "buddy" sensor is in an "active" state when trace 906 is at the level of "A." The second buddy sensor is in a "holding" state when trace 906 is at a level of "H." The second "buddy" sensor is in a "stationary" state when trace 906 is at a level of "S." The horizontal axis represents time and time increases from the left side of the figure to the right side of the figure. Trace 906 represents the state of the second "buddy" selected sensor.

The fourth plot from the top of FIG. 9 is a plot of a value stored in a stuck high timer versus time. The vertical axis represents an amount of time that is accumulated in the stuck high timer and the amount of time increases in the direction of the vertical axis arrow. The horizontal axis represents time and time increases from the left side of the figure to the right side of the figure. Trace 908 represents the amount of time that is stored in the stuck high timer. Horizontal line 950 represents a threshold amount of time that when exceeded by the stuck high timer causes mitigating actions to be taken (e.g., temporarily deactivate the vehicle or machine).

The fifth plot from the top of FIG. 9 is a plot of a vehicle or machine operating state versus time. The vertical axis represents the operating state of the vehicle or machine. The vehicle or machine is on or operating when trace 910 is at a lower level near the horizontal axis. The vehicle or machine is off or not operating when trace 910 is at a higher level near the vertical axis arrow. Trace 910 represents the operating state of the vehicle or machine. The horizontal axis represents time and time increases from the left side of the figure to the right side of the figure.

At time t5, the selected sensor state, state of the 1$^{st}$ buddy sensor of the selected sensor, and state of the 2$^{nd}$ buddy sensor of the selected buddy sensor are all indicating "stationary" states. The stuck high timer value is zero and the vehicle is operating.

At time t6, the selected sensor state transitions to "active" while the states of the state of the 1$^{st}$ buddy sensor of the selected sensor and the state of the 2$^{nd}$ buddy sensor of the selected buddy sensor are indicating "stationary." Thus, the selected sensor output becomes degraded as compared to its expected output. The value in the stuck high timer begins to increase and the vehicle remains activated.

At time t7, the value in the stuck high timer exceeds threshold 950, which causes the vehicle to be deactivated. The selected sensor state remains "active" while the states of the state of the 1$^{st}$ buddy sensor of the selected sensor and the state of the 2$^{nd}$ buddy sensor of the selected buddy sensor are indicating "stationary."

Figure 10:
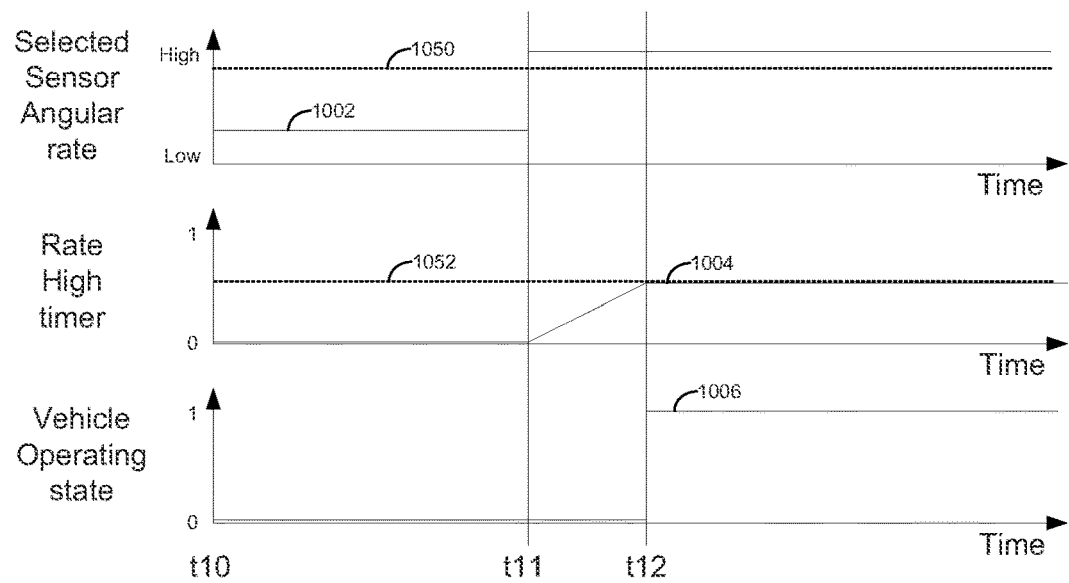

Referring now to FIG. 10, an example operating sequence that may be provided via the system of FIGS. 1A-2 in cooperation with the method of FIGS. 3-7 is shown. In particular, FIG. 10 shows an example operating sequence where angular rate output of a selected sensor is higher than may be expected. The plots of FIG. 10 are aligned in time and occur at the same time.

The first plot from the top of FIG. 10 is a plot of an angular rate of a selected sensor versus time. The vertical axis represents the angular rate of the selected sensor (e.g., a boom sensor) and the angular rate of the sensor increase in the direction of the vertical axis arrow. The horizontal axis represents time and time increases from the left side of the figure to the right side of the figure. Trace 1002 represents the angular rate of the selected sensor. Horizontal line 1050 represents a threshold amount of angular rate that when exceeded causes the rate high timer to increment.

The second plot from the top of FIG. 10 is a plot of a value stored in a rate high timer versus time. The vertical axis represents an amount of time that is accumulated in the rate high timer and the amount of time increases in the direction of the vertical axis arrow. The horizontal axis represents time and time increases from the left side of the figure to the right side of the figure. Trace 1004 represents the amount of time that is stored in the rate high timer. Horizontal line 1052 represents a threshold amount of time that when exceeded by the rate high timer causes mitigating actions to be taken (e.g., temporarily deactivate the vehicle or machine).

The third plot from the top of FIG. 10 is a plot of a vehicle or machine operating state versus time. The vertical axis represents the operating state of the vehicle or machine. The vehicle or machine is on or operating when trace 1006 is at a lower level near the horizontal axis. The vehicle or machine is off or not operating when trace 1006 is at a higher level near the vertical axis arrow. Trace 1006 represents the operating state of the vehicle or machine. The horizontal axis represents time and time increases from the left side of the figure to the right side of the figure.

At time t10, the angular rate of the selected sensor is less than threshold 1050. The rate high timer value is zero and the vehicle is operating.

At time t11, the angular rate of the selected sensor exceeds threshold 1050 so that the value in the rate high timer begins to increase. The vehicle remains activated.

At time t12, the value in the rate high timer exceeds threshold 1050, which causes the vehicle to be deactivated. The rate high timer value ceases increasing.

In this way, a vehicle or machine may be stopped or operate with reduced capacity in response to an angular rate of a sensor exceeding a threshold. The threshold value may represent the maximum capacity of the machine. Thus, output of the sensor may be evaluated with respect to a maximum output of a machine instead of being compared to outputs of other similarly situated sensors.

Figure 11:
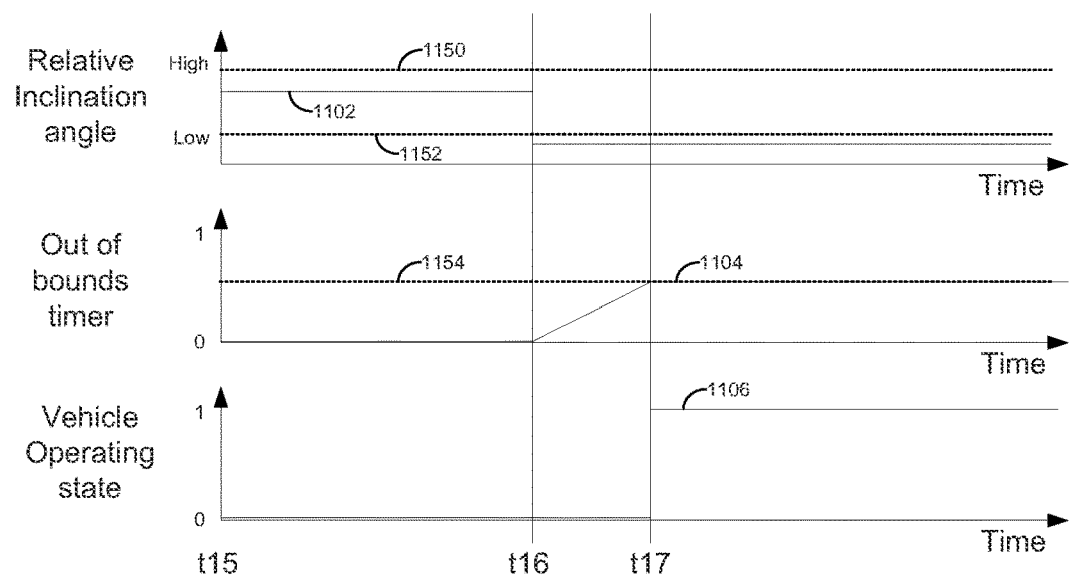

Referring now to FIG. 11, an example operating sequence that may be provided via the system of FIGS. 1A-2 in cooperation with the method of FIGS. 3-7 is shown. In particular, FIG. 11 shows an example operating sequence where inclination angle output of a selected sensor is lower than may be expected. The plots of FIG. 11 are aligned in time and occur at the same time.

The first plot from the top of FIG. 11 is a plot of an inclination angle of a selected sensor versus time. The vertical axis represents the inclination angle of the selected sensor (e.g., a boom sensor) and the inclination angle of the sensor increase in the direction of the vertical axis arrow. The horizontal axis represents time and time increases from the left side of the figure to the right side of the figure. Trace 1102 represents the inclination angle of the selected sensor. Horizontal line 1150 represents an upper threshold boundary that when exceeded by the inclination angle causes mitigating actions to be taken (e.g., temporarily deactivate the vehicle or machine). Horizontal line 1152 represents a lower threshold boundary. If the inclination angle is less than the level of horizontal line 1152, mitigating actions to be taken.

The second plot from the top of FIG. 11 is a plot of a value stored in an out of bounds timer versus time. The vertical axis represents an amount of time that is accumulated in the out of bounds timer and the amount of time increases in the direction of the vertical axis arrow. The horizontal axis represents time and time increases from the left side of the figure to the right side of the figure. Trace 1104 represents the amount of time that is stored in the out of bounds timer. Horizontal line 1154 represents a threshold amount of time that when exceeded by the out of bounds timer causes mitigating actions to be taken (e.g., temporarily deactivate the vehicle or machine).

The third plot from the top of FIG. 11 is a plot of a vehicle or machine operating state versus time. The vertical axis represents the operating state of the vehicle or machine. The vehicle or machine is on or operating when trace 1106 is at a lower level near the horizontal axis. The vehicle or machine is off or not operating when trace 1106 is at a higher level near the vertical axis arrow. Trace 1106 represents the operating state of the vehicle or machine. The horizontal axis represents time and time increases from the left side of the figure to the right side of the figure.

At time t16, the inclination angle of the selected sensor is greater than threshold 1152 and less than threshold 1150. The out of bounds timer value is zero and the vehicle is operating.

At time t17, the angular rate of the selected sensor is less than threshold 1152 so that the value in the out of bounds timer begins to increase. The vehicle remains activated.

At time t18, the value in the out of bounds timer exceeds threshold 1154, which causes the vehicle to be deactivated. The out of limit timer value ceases increasing.

In this way, a vehicle or machine may be stopped or operate with reduced capacity in response to an inclination angle being out of bounds. The bounds may represent the physical limits of the machine. Thus, output of the sensor may be evaluated with respect to physical boundary conditions of the machine instead of being compared to outputs of other similarly situated sensors.

Figure 12:
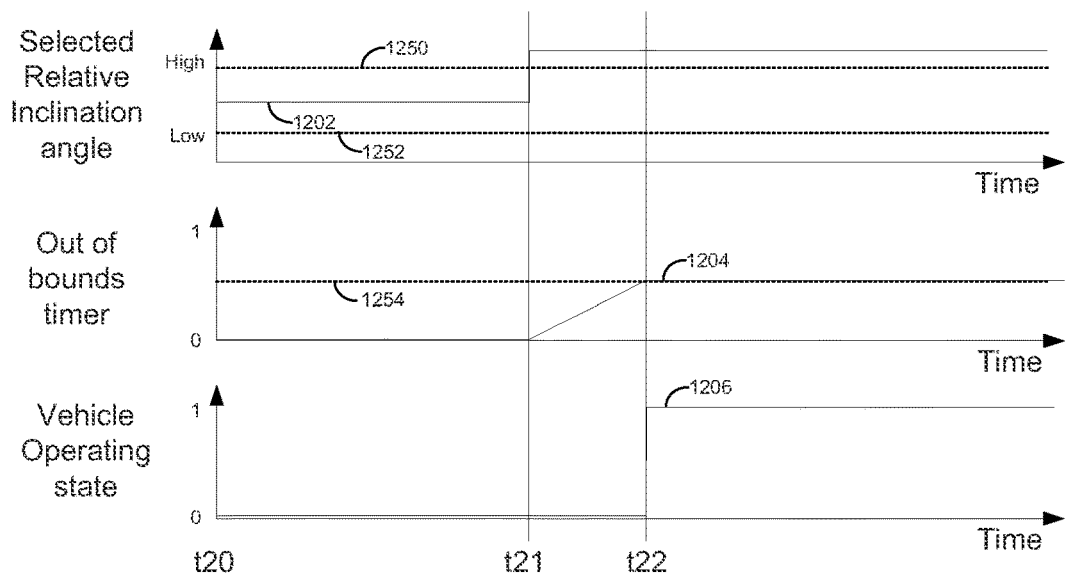

Referring now to FIG. 12, an example operating sequence that may be provided via the system of FIGS. 1A-2 in cooperation with the method of FIGS. 3-7 is shown. In particular, FIG. 12 shows an example operating sequence where inclination angle output of a selected sensor is higher than may be expected. The plots of FIG. 12 are aligned in time and occur at the same time.

The first plot from the top of FIG. 12 is a plot of an inclination angle of a selected sensor versus time. The vertical axis represents the inclination angle of the selected sensor (e.g., a boom sensor) and the inclination angle of the sensor increase in the direction of the vertical axis arrow. The horizontal axis represents time and time increases from the left side of the figure to the right side of the figure. Trace 1202 represents the inclination angle of the selected sensor. Horizontal line 1250 represents an upper threshold boundary that when exceeded by the inclination angle causes mitigating actions to be taken (e.g., temporarily deactivate the vehicle or machine). Horizontal line 1252 represents a lower threshold boundary. If the inclination angle is less than the level of horizontal line 1252, mitigating actions to be taken.

The second plot from the top of FIG. 12 is a plot of a value stored in an out of bounds timer versus time. The vertical axis represents an amount of time that is accumulated in the out of bounds timer and the amount of time increases in the direction of the vertical axis arrow. The horizontal axis represents time and time increases from the left side of the figure to the right side of the figure. Trace 1204 represents the amount of time that is stored in the out of bounds timer. Horizontal line 1254 represents a threshold amount of time that when exceeded by the out of bounds timer causes mitigating actions to be taken (e.g., temporarily deactivate the vehicle or machine).

The third plot from the top of FIG. 12 is a plot of a vehicle or machine operating state versus time. The vertical axis represents the operating state of the vehicle or machine. The vehicle or machine is on or operating when trace 1206 is at a lower level near the horizontal axis. The vehicle or machine is off or not operating when trace 1206 is at a higher level near the vertical axis arrow. Trace 1206 represents the operating state of the vehicle or machine. The horizontal axis represents time and time increases from the left side of the figure to the right side of the figure.

At time t20, the inclination angle of the selected sensor is greater than threshold 1252 and less than threshold 1250. The out of bounds timer value is zero and the vehicle is operating.

At time t21, the angular rate of the selected sensor is greater than threshold 1250 so that the value in the out of bounds timer begins to increase. The vehicle remains activated.

At time t22, the value in the out of bounds timer exceeds threshold 1254, which causes the vehicle to be deactivated. The out of bounds timer value ceases increasing.

In this way, a vehicle or machine may be stopped or operate with reduced capacity in response to an inclination angle being out of bounds. The bounds may represent the physical limits of the machine. Thus, output of the sensor may be evaluated with respect to physical boundary conditions of the machine instead of being compared to outputs of other similarly situated sensors.

Figure 13:
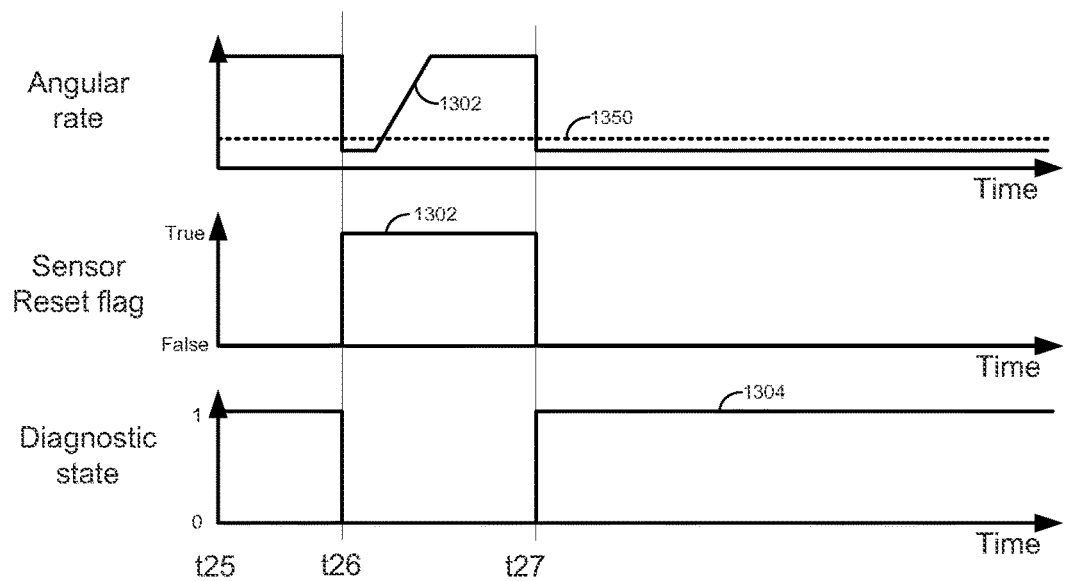

Referring now to FIG. 13, an example operating sequence that may be provided via the system of FIGS. 1A-2 in cooperation with the method of FIGS. 3-7 is shown. In particular, FIG. 13 shows an example operating sequence where sensor resets occur. The plots of FIG. 13 are aligned in time and occur at the same time.

The first plot from the top of FIG. 13 is a plot of angular rate of a selected sensor versus time. The vertical axis represents the angular rate of the selected sensor (e.g., a boom sensor) and the angular rate of the sensor increase in the direction of the vertical axis arrow. The horizontal axis represents time and time increases from the left side of the figure to the right side of the figure. Trace 1302 represents the inclination angle of the selected sensor. Horizontal line 1350 represents an angular rate of 25% of the angular rate at time t25.

The second plot from the top of FIG. 13 is a plot of a state of a sensor reset flag versus time. The vertical axis represents a state of the sensor reset flag and the sensor reset flag is true when trace 1304 is at a higher level near the vertical axis arrow. The sensor reset flag is false when trace 1304 is at a lower level near the horizontal axis. The horizontal axis represents time and time increases from the left side of the figure to the right side of the figure. Trace 1304 represents the sensor reset flag state.

The third plot from the top of FIG. 13 is a plot of sensor diagnostic state versus time. The vertical axis represents the sensor diagnostic state. The sensor diagnostics are activated when trace 1306 is at a higher level near the vertical axis arrow. The sensor diagnostics are not activated when trace 1306 is at a lower level near the horizontal axis. Trace 1306 represents the sensor diagnostic operating state. The horizontal axis represents time and time increases from the left side of the figure to the right side of the figure.

At time t25, the angular rate is constant and the sensor reset flag is false indicating that the sensor has not been reset. Resetting the sensor may cause a constant angular rate to be subtracted from the angular rate that is determined via the sensor's gyro. The diagnostic state is at a high level indicating that the diagnostic algorithm is active (e.g., steps 374-399).

At time t26, the sensor resets itself based on the angular rate being constant. However, it may not be desirable to reset the sensor simply because the angular rate is constant. In particular, it may not be desirable to reset the sensor if boundary limits of the sensor have not been exceeded. Therefore, the sensor diagnostic state is transitioned to not asserted. The sensor reset flag is also asserted since the angular rate value has been reduced by more than 75% of its original value at time t25.

Between time t26 and time t27 the angular rate increases and then it becomes a steady value. The sensor reset flag is unchanged and the diagnostic state is unchanged.

At time t27, the angular rate is constant once again and a corrective sensor reset is generated. As a result, the sensor reset flag is not asserted and sensor diagnostics are reactivated. In this way, a sensor reset may cause sensor diagnostics to be activated or temporarily deactivated.

Note that the example control and estimation routines included herein can be used with various vehicle or machine system configurations. The control methods and routines disclosed herein may be stored as executable instructions in non-transitory memory and may be carried out by the control system including the controller in combination with the various sensors, actuators, and other machine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to cranes, excavators, scrapers, and other systems that include linked or coupled components.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a machine that includes a plurality of sensors, comprising:
   a plurality of coupled components including at least one sensor coupled to each of the plurality of coupled components;
   a controller including a non-transitory computer readable medium having executable instructions to characterize operation of the at least one sensor coupled to each of the plurality of coupled components into one state included in a group of states comprising "stationary,"

"holding," and "active," and executable instructions to adjust a device in response to states of a selected sensor and two other sensors.

2. The system of claim 1, further comprising additional executable instructions to start a timer in response to the states of the selected sensor and the two other sensors.

3. The system of claim 1, further comprising additional executable instructions to deactivate diagnostics for the at least one sensor coupled to each of the plurality of coupled components in response to an angular rate of one sensor changing more than a threshold amount.

4. The system of claim 3, where the angular rate of the one sensor changes by more than the threshold amount between two adjacent execution cycles of a sensor monitoring algorithm.

5. The system of claim 4, further comprising additional instructions to activate diagnostics for the at least one sensor coupled to each of the plurality of coupled components in response to an angular rate of one sensor changing more than a threshold amount.

6. The system of claim 5, further comprising additional instructions to activate diagnostics for the at least one sensor coupled to each of the plurality of coupled components in further response to an angular rate of motion indicated by one or more of the at least one sensor coupled to each of the plurality of coupled components exceeding a threshold rate.

7. The system of claim 6, further comprising additional instructions to activate diagnostics for the at least one sensor coupled to each of the plurality of coupled components in further response to the machine being stationary for a threshold amount of time.

* * * * *